Figure 1:
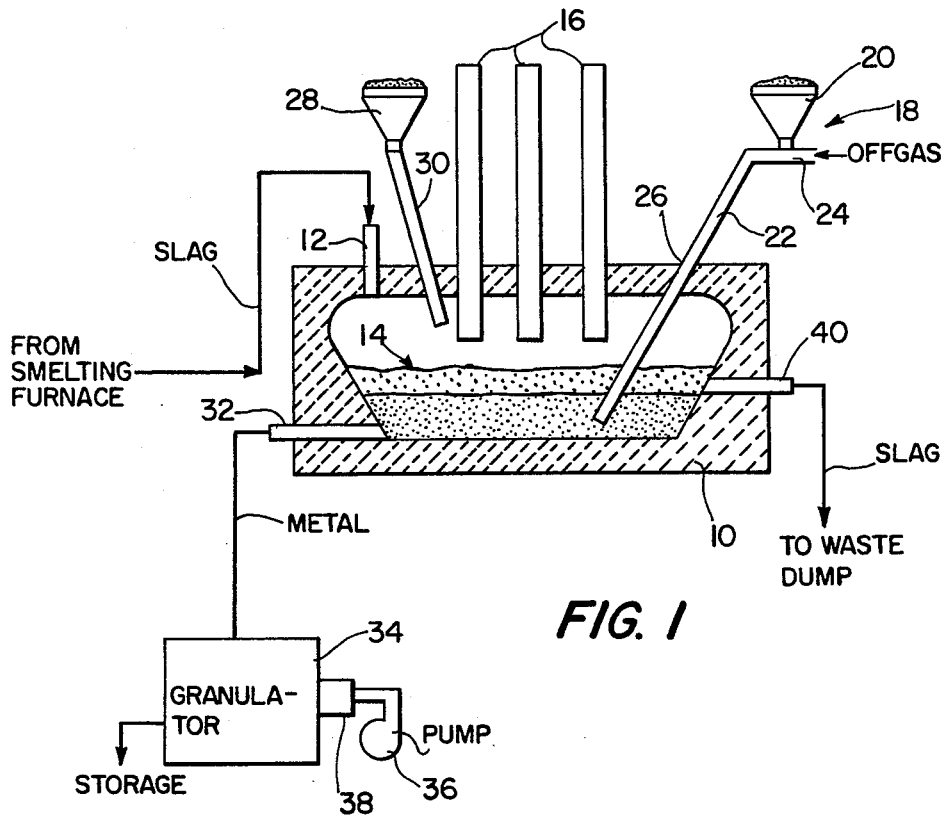

United States Patent [19]

Paulson et al.

[11] 4,110,107

[45] Aug. 29, 1978

[54] PROCESS FOR REDUCING MOLTEN FURNACE SLAGS BY CARBON INJECTION

[75] Inventors: Danton L. Paulson, Rolla, Mo.; Willard L. Hunter, Albany, Oreg.

[73] Assignee: The United States of America as represented by the Secretary of the Interior, Washington, D.C.

[21] Appl. No.: 848,851

[22] Filed: Nov. 7, 1977

Related U.S. Application Data

[63] Continuation-in-part of Ser. No. 806,989, Jun. 16, 1977, abandoned.

[51] Int. Cl.² .............................. C21B 3/04; C22B 7/04
[52] U.S. Cl. ............................................. 75/24; 75/40; 75/72; 75/82
[58] Field of Search ................... 75/24, 21, 72, 74, 82, 75/40

[56] References Cited

U.S. PATENT DOCUMENTS

| | | | |
|---|---|---|---|
| 1,313,274 | 8/1919 | DeBarros | 75/11 |
| 1,822,588 | 9/1931 | Fowler et al. | 75/24 |
| 2,164,483 | 7/1939 | Watson et al. | 302/56 |
| 2,762,701 | 9/1956 | Crego et al. | 75/48 |

*Primary Examiner*—M. J. Andrews
*Attorney, Agent, or Firm*—William S. Brown; Donald A. Gardiner

[57] ABSTRACT

A process is provided for recovering metals from metal-containing slags such as iron-copper slags from copper smelting furnaces and iron-nickel slags produced in smelting nickel-bearing ores. The molten slag is fed to an electric-arc furnace wherein a molten metal bath is formed. A carbon injection unit, including an injector tube which is inserted into the furnace, is used to inject carbon into the bottom of the molten metal bath. A flux, such as CaO, is also fed, as needed, to the bath. After reduction, the metal product is tapped from the furnace.

7 Claims, 2 Drawing Figures

PROCESS FOR REDUCING MOLTEN FURNACE SLAGS BY CARBON INJECTION

This application is a continuation-in-part of application Ser. No. 806,989, filed June 16, 1977 now abandoned.

With the increasing awareness of the necessity of the husbanding of natural resources if modern industrial societies are to continue to exist, there has been a heightened interest in eliminating waste and obtaining the maximum out of such resources as they are used. One area in which substantial benefits can be realized is that of recovering metal from slags, particularly molten slags since energy consumption is substantially reduced by treatment of already molten slag. Two specific slags of particular interest are copper-iron slags, such as those produced by copper smelting furnaces, and nickel-iron slags, such as those produced as byproducts of melting nickel-bearing laterites and sepentine ores in electric furnaces.

A number of processes and techniques are available for recovering metals and/or other materials from slags. Representative patents in this area include U.S. Pat. Nos. 596,705 (Hartenstein) 905,980 (Betts); 1,544,048 (Stout); 1,822,588 (Fowler et al); 2,653,868 (Lichty); 3,081,163 (Kuzell et al); 3,157,490 (Wiberg); 3,314,783 (Zimmerley et al) and 3,857,700 (Ammann et al). Briefly considering these patents, the Hartenstein patent discloses a process for utilizing the waste products of blast furnaces wherein slag is subjected to treatment with a carbonaceous material and electric current. The Betts patent discloses a metallurgical process wherein silicon is used in recovering iron and copper from a slag. The Stout patent discloses a method of treatment of copper metallurgical slag wherein the slag is treated with iron to extract additional copper. The Fowler et al patent discloses a process for recovering copper from slag wherein carbonaceous material is added to reduce the slag and obtain the copper therefrom. The Lichty patent discloses a process for recovery of metals from metallurgical slag wherein silicon is used as a reducing agent to obtain iron and copper from the slag. The Kuzell patent discloses a process of treating copper matte wherein iron and copper are recovered by air blowing a molten charge of the matte. The Wiberg patent discloses a method for refining metals. The Zimmerley et al patent discloses recovery of molybdenum from slag by means of a reduction smelting operation. The Ammann et al patent discloses a process for recovering copper from molten converter-type slags wherein the magnetite in the slag is reduced with carbonaceous materials and/or other solid reductants and stirring of the slag is utilized.

These prior art processes have, however, generally been relatively inefficient due to the difficulty of obtaining effective contact, i.e., wetting, between molten oxides, contained in molten slag, and solid reductants such as carbon. It has now been found, according to the process of the invention, that this problem is largely overcome, and the efficiency of reduction of the molten slags substantially improved, by injection of the reductant into a molten metal bath, below and in contact with the molten slag, rather than introduction of reductant into the slag itself. The process of the invention thus comprises forming and maintaining a molten metal bath below, and in contact with the molten slag, and injection of the carbon reductant into the molten metal. This procedure has been found to optimize utilization of the reductant by allowing its dispersion and dissolution in the molten metal bath before contacting and reacting with the molten slag at the molten metal-molten slag interface.

According to the preferred embodiment of the process, molten slag from a source as the above-mentioned copper smelting or electric furnaces is fed to an electric-arc furnace at a rate so as to maintain the slag in a molten state within the furnace. Startup of the operation will, however, normally require introduction of a charge of cold slag to the electric-arc furnace in order to bring the furnace up to operating temperature by conventional means. Optimum operating temperature will generally be the temperature required to maintain the slag in a molten state. Suitable temperatures will generally be in the range of about 1450° to 1650° C., with the optimum for the preferred copper-ion and nickel-iron slags usually being about 1550° C. The molten metal bath may be formed by initial injection of the reductant into the molten slag to form the molten metal by reduction of the slag. Alternatively, and generally more conveniently, an appropriate amount of metal, such as scrap iron, may be initially charged to the furnace, whereby the molten metal bath is formed within the furnace. Following startup of the operation, the molten metal bath, consisting of product metal, is formed continuously by reduction of the molten slag. A flux, preferably a material containing CaO, is also added, as needed, to the molten bath to provide chemical, physical, and electrical properties commensurate with efficient furnace operation.

The carbon reductant is injected into the molten metal bath by means of an injector tube which is inserted into the furnace to a depth sufficient to deliver the reductant to the molten metal, i.e., below the slag-metal interface. The carbon injection unit preferably comprises a hopper which is vibrated to provide feeding of the carbon charge, a gas being supplied to enhance feeding of the carbon to the injector tube. Suitable gases include inert gases, air, and hot furnace off-gases. Dispersion of the carbon through the molten metal bath is achieved via turbulence induced by the electric furnace currents and injection gas. Advantageously, coke breeze is used as the carbon reductant; however, other forms of carbon such as petroleum coke and coal may also be used as reductant. Pebble lime is the preferred flux material; however, other CaO materials such as limerock may also be used.

Figure 2:
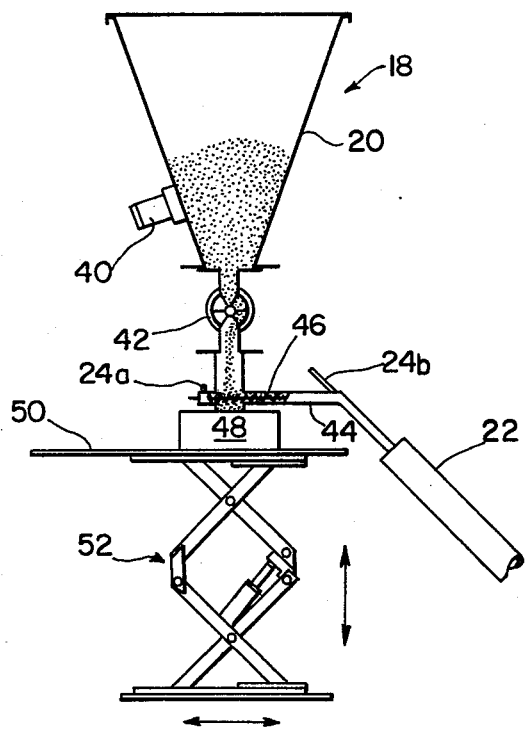

FIG. 1 is a diagrammatic representation, partially in section, of an electric-arc furnace employing carbon injection in accordance with the process of the invention; and FIG. 2 is a side elevational view of the carbon injection unit which is shown schematically in FIG. 1.

As discussed above, the present invention is principally concerned with the recovery of iron and copper from molten copper smelting furnace slags and with the recovery of iron and nickel from molten ferronickel slags, although other uses are possible. The invention will be basically described with respect to the former, i.e., the recovery of iron and copper, although the latter application will also be discussed below. The preferred embodiments of the invention will now be described with reference to the figures.

Referring to FIG. 1, a schematic representation of a system for carrying out the process of the invention is shown. The system includes an electric-arc furnace 10, with electrodes 16, that is basically fabricated of a refractory material and is of generally conventional construction. Electric furnace 10 is designed to receive molten slag 14 from a copper smelting furnace (not shown) through a feed port 12. The molten slag, which can be 30 to 50 wt.-pct. Fe, is tapped from the smelting furnace into the electric furnace 10 for iron and copper reduction. Molten product metal 15 is formed by reduction of the molten slag and forms a layer beneath the molten slag.

Carbon is injected into the molten product metal bath 15, preferably near the bottom thereof, by means of carbon injector unit 18 which is described below in connection with FIG. 2. Injector unit 18 includes a feed hopper 20 and hollow graphite injector tube 22 which includes an inlet 24 for a feed gas, preferably air. To provide carbon injection, the injector tube 22 is inserted through a feed port 26 in furnace 10 and, after the injector is started, the tip of injector tube 22 is lowered to the bottom of the molten metal bath 15 by suitable means such as the hydraulic scissors jack 52 shown in FIG. 2.

If required, a suitable flux, preferably a CaO-containing material, e.g., pebble lime, is gravity fed by conventional means including a hopper 28 and feed pipe 30 onto the top of the molten slag 14. Flux feed is advantageously carried out after the initial reaction has subsided and the injection operation has stabilized.

Furnace 10 includes a tapping port 32 from which the product metal is tapped. Tapping of the metal is performed frequently and is carried out in accordance with a program or schedule determined by the range of molten metal bath depths consistent with efficient operation of the furnace 10. The molten metal, at approximately 1,500° C, is fed from the furnace 10 to a conventional granulator 34. Water is fed to granulator 34 from a pump 36 through a nozzle manifold 38 to provide granulation of the metal. It is contemplated that the metallic product, after granulation, will be used in a conventional copper cementation process wherein, for example, the product would be supplied to a cone precipitor and mixed with a copper bearing solution to produce cement copper. Furnace 10 also includes tapping port 40 from which the depleted slag is tapped. Tapping of the slag is also performed frequently in accordance with a program determined by the type and feed rate of the molten slag fed to the furnace, type and amount of reductant, etc.

Referring to FIG. 2, an exemplary embodiment of the carbon injector unit 18 of FIG. 1 is shown. As noted hereinbefore, unit 18 includes a hopper 20 which communicates with hollow injector tube 22. This tube is preferably of graphite, but may also be of other inert materials. Hopper 20 includes a vibrator 40 mounted thereon which provides vibrational feeding of the carbon charge. A star valve 42 is located between the outlet opening of the hopper 20 and the transversely disposed inlet pipe 44 of injector tube 20. A screw feeder 46 is located within inlet pipe 44, and gas is supplied to inlet pipe 44 at a first input port 24a located upstream of feeder 46 and at a second, downstream inlet port 24b. Inlet pipe 44 communicates with injector tube 20 which, as stated, is hollow. The injector unit includes a base member 48 disposed on a support plate 50 which is, in turn, supported by the hydraulic scissors jack referred to above and denoted 52 in FIG. 2. Jack 52 is itself mounted on a wheeled frame or the like to provide the desired positioning of the entire unit relative in the furnace feed port.

The invention will now be more specifically illustrated by the following examples.

EXAMPLE 1

In this example, which is analogous to start-up of a continuous operation, an 800 kVA electric-arc furnace was used. Pebble lime was employed as flux and the slag feed consisted of a copper-iron reverberatory furnace slag. The operational sequence was as follows:

1. Approximately 500 lb. of the reverberatory furnace slag and 600 lb. of scrap iron were melted in the furnace. The scrap iron was included to form the initial metal bath.
2. Another 500 lb. of the slag was gravity fed into the furnace at a rate slow enough to maintain a completely molten bath.
3. A hollow graphite tube, corresponding to injector tube 22 of FIGS. 1 and 2, was inserted through the furnace feed port (element 24).
4. After the injector was started up, the tip of the injector tube was lowered to the bottom of molten metal bath by means of a hydraulic jack (element 52).
5. After the initial reaction had subsided, and the carbon injection was operating properly, pebble lime was gravity fed to the furnace by means corresponding to hopper 28 and feed pipe 30.
6. The process was terminated by removing the carbon injector and stopping the flux feeder.
7. Slag was removed from the furnace through a taphole corresponding to port 40 of FIG. 1.
8. The metal product and remaining slag were tapped through the metal taphole corresponding to port 32 of FIG. 1.
9. The metal was poured into molds that form approximately 50 lb. pigs.

Types and amounts of feed materials, and results are shown in Table 1.

Table 1

| Charge: | | |
|---|---|---|
| Reverberatory furnace slag | 1,000 lb. | |
| Pebble lime (95 wt-pct CaO) | 156 | |
| Coke breeze (88.17 wt-pct C) | 110 | |
| Scrap iron | 600 | |
| Products: | | |
| Metal | 867 lb. | |
| Slag | 1,024 | |
| Analyses: | | |
| Starting slag | Final Slag | Iron product |
| Fe 34.6 wt-pct | Fe 7.0 wt-pct | Cu 1.75 wt-pct |
| Cu 0.5 wt-pct | Cu 0.03 wt-pct | C 0.29 wt-pct |
| Iron recovered from reverberatory furnace slag as metal | | 76 pct |
| Copper recovered as metal | | 94 pct |

EXAMPLE 2

In this example a ferronickel slag was treated by means of a procedure essentially the same as that employed in Example 1. Types and amounts of feed material, and results, are shown in Table 2.

Table 2

| Charge: | | |
|---|---|---|
| Fe-Ni slag | 1,000 lb. | |
| Pebble lime (95 wt-pct CaO) | 180 | |
| Coke breeze (88.17 wt-pct C) | 150 | |
| Scrap iron | 592 | |
| Products: | | |
| Metal | 820 lb. | |
| Slag | 970 | |
| Analyses: | | |
| Starting slag | Final slag | Iron product |
| Fe pct = 32.6 | 4.0 | 95.9 |

Table 2-continued

| Ni, pct = 0.14 | 0.02 | 0.17 |
| --- | --- | --- |
| Fe recovered as metal = 85.7 pct | | |
| Ni recovered as metal = 99.6 pct | | |

We claim:

1. A process for recovering metals from a molten slag by reducing the slag with carbon, said process comprising:

feeding the metal-containing molten slag to an electric furnace at a rate so as to maintain the slag in a molten state;

providing a molten metal bath beneath, and in contact with, the molten slag;

inserting an injector tube of a carbon injecting device into said furnace and injecting carbon through said injector tube into the bottom of the molten metal bath;

feeding a flux, as needed, to the molten slag;

tapping off the metal product; and tapping off the residual slag.

2. The process of claim 1 wherein the metals to be recovered comprise metals selected from the groups consisting of iron and nickel, and iron and copper.

3. The process of claim 1 wherein said slag is selected from the group consisting of ferrocopper slags and ferronickel slags.

4. The process of claim 3 wherein said flux comprises CaO.

5. The process of claim 4 wherein said CaO flux comprises pebble lime.

6. The process of claim 3 wherein said carbon comprises coke breeze.

7. The process of claim 1 wherein said carbon injecting step includes vibrating a carbon-containing hopper to produce feeding of said carbon to said injector tube, a gas being supplied to said carbon during the feeding of the carbon to said injector tube to enhance said feeding.

* * * * *